Dec. 3, 1957  E. H. JERNBERG  2,815,461
AMORTISSEUR WINDINGS FOR ALTERNATING-CURRENT MACHINES
Filed June 10, 1955  2 Sheets-Sheet 1

INVENTOR

EVERT H. JERNBERG

Akel C. Benson
ATTORNEY

Dec. 3, 1957  E. H. JERNBERG  2,815,461
AMORTISSEUR WINDINGS FOR ALTERNATING-CURRENT MACHINES
Filed June 10, 1955  2 Sheets-Sheet 2
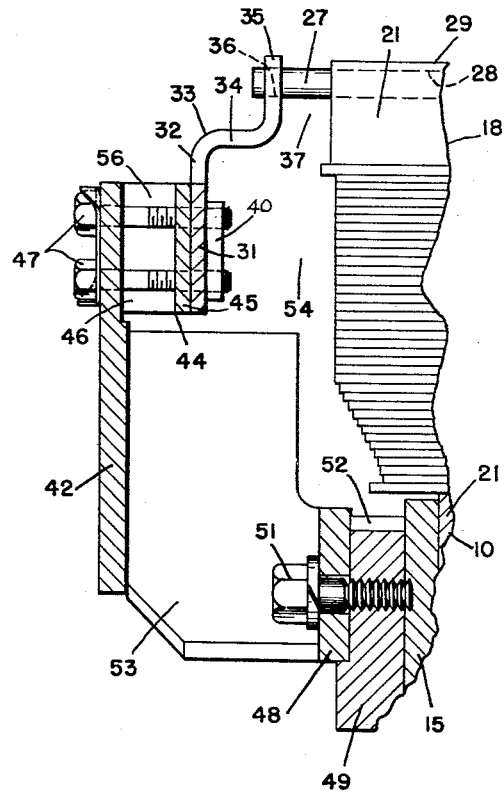
FIG. 2
FIG. 3
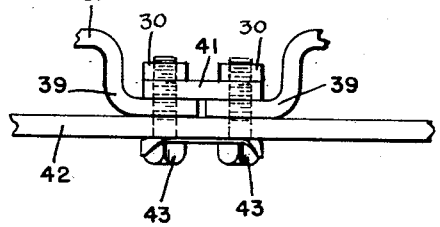
INVENTOR
EVERT H. JERNBERG
Akel C. Benson
ATTORNEY

United States Patent Office 2,815,461
Patented Dec. 3, 1957

2,815,461

AMORTISSEUR WINDINGS FOR ALTERNATING-CURRENT MACHINES

Evert H. Jernberg, St. Paul, Minn., assignor to Electric Machinery Mfg. Company, Minneapolis, Minn., a corporation of Minnesota Application June 10, 1955, Serial No. 514,523

6 Claims. (Cl. 310—183)

The herein disclosed invention relates to rotors for alternating current machines and has for an object to provide a rotor capable of heavy momentary overloads.

Another object of the invention resides in providing a rotor utilizing an amortisseur winding in which breakage of the parts of the winding through irregular heating of said parts is prevented.

A still further object of the invention resides in constructing the amortisseur winding with bars extending through slots in the core of the rotor, in providing end rings for the bars spaced longitudinally therefrom and in providing fingers extending between said ring and bars.

A feature of the invention resides in constructing the end rings smaller in diameter than the core and in forming the fingers with longitudinal portions extending inwardly from the ring and with radial portions extending outwardly therefrom and attached to the bars.

An object of the invention resides in providing an annulus attached to one of the end rings concentric with the rotor and spaced therefrom and in providing blower blades attached to said annulus and directing air past said core, end ring and fingers.

A still further object of the invention resides in providing a second annulus spaced from and attached to said core and to which said blades are further attached.

Other objects of the invention reside in the novel combination and arrangement of parts and in the details of construction hereinafter illustrated and/or described.

In the drawings:

Fig. 2 is a cross sectional view taken on line 2—2 of Fig. 1 and drawn to a greater scale.

Fig. 3 is a fragmentary elevational view taken on line 3—3 of Fig. 1 and drawn to the same scale as Fig. 2.

Figure 1:
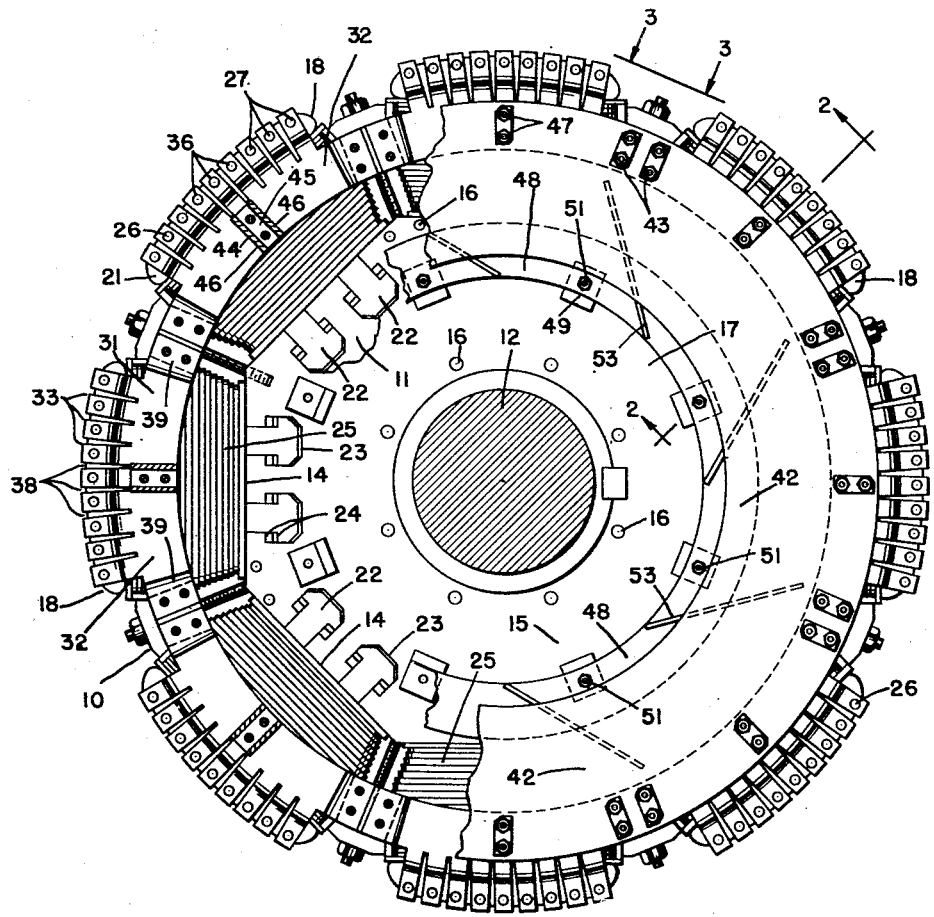
Fig. 1 is an end elevational view of a rotor with parts broken away and illustrating the application of an embodiment of the invention thereto.

For the purpose of illustrating the invention a portion of a rotor 10 of a synchronous motor has been shown. This rotor consists of a number of laminations 11 which are mounted upon a shaft 12. These laminations are eight-sided and provide eight symmetrical surfaces 14 parallel to the axis of the shaft 12. Overlying these laminations are end plates 15 of the same shape and form as the laminations 11. These parts are rigidly secured together by means of rods 16 which extend through said plates and laminations and which are riveted in position to clamp the parts together upon the shaft 12. By means of this construction, a core center, indicated by the reference numeral 17, is formed and which supports a number of pole pieces 18. These pole pieces are similarly constructed to the core center 17 and are formed by means of laminations, not shown, and end plates 21. These parts are similarly secured together. The pole pieces 18 have formed thereon T-shaped tongues 22 which enter T-shaped slots 23 in the core center 17. Wedges 24 driven into the spaces between the shoulders on the tongues 22 and those formed at the ends of the slots 23 hold the pole pieces attached to the core. On the pole pieces 18 are windings 25 which serve to drive the motor after the same reaches synchronous speed.

For the purpose of starting the motor an amortisseur winding 26 is employed. This winding consists of a number of bars 27 which are received in slots 28 formed in the outer arcuate faces 29 of the pole pieces 18. These bars extend outwardly beyond the plates 21 and have attached to them end rings, one of which is shown in Fig. 1 and indicated by the reference numeral 31. Both of the end rings are similar in construction and for this reason only the end ring 31 has been shown and will be described in detail.

The end ring 31 consists of a number of end ring segments 32 arcuate in form and there being one segment for ecah pole piece. The end ring 31 is smaller in diameter than the circumference of the pole pieces 18. Extending outwardly from each segment are a number of fingers 33. These fingers are bent to provide longitudinal portions 34 extending inwardly toward the pole pieces 18 and radial portions 35 extending radially outwardly therefrom. The portions 35 are formed with holes 36 to receive the bars 27 and the said bars and fingers are secured together by soldering, brazing or otherwise. The bars 27, as noted in Fig. 2, extend outwardly beyond the plates 21 so that when the fingers 33 are attached thereto spaces 37 are formed between said fingers and plates. The fingers 31 are also formed with spaces 38 therebetween as best shown in Fig. 1.

The segments 32 of the end rings are joined together in the following manner: At the ends of said segments the same are formed with offsets 39. These offsets lie in a plane spaced from the major portion of said rings as shown in Fig. 3. Connecting strips 41 overlie the offsets 39 and are secured thereto by soldering, brazing or otherwise. Overlying the offsets 39 is an annulus 42 which is substantially of the same diameter as the end ring 31 and which extends inwardly therefrom. This annulus, due to the offsets 39, becomes spaced from the ring 31 and also from the pole pieces 18. Bolts 43 extend through the annulus 42, offsets 39, and strips 41 and are screwed into lock bars 30. The annulus 42 is also secured to the segments 32 intermediate their ends as best shown in Fig. 2. For this purpose a U-shaped spacer 44 is employed which has a web 45 and legs 46 extending outwardly therefrom. Bolts 47 extend through said annulus, the web 45, and segments 32 and are screwed into lock bars 40. By means of this construction the annulus 42 is securely attached to the end ring 31.

In addition to the annulus 42 another annulus 48 is employed which is of smaller diameter than the annulus 42. This annulus overlies a number of blocks 49 welded to the plate 15. These blocks are tapped to receive bolts 51 which clamp the annulus in place. By means of these blocks the annulus 48 is spaced from the plate 15 to form passageways 52 therebetween. Attached to the annuli 42 and 48 are a number of blower blades 53 which are angularly disposed as best shown in Fig. 1. These blades when the rotor is in motion force air outwardly between the annuli 42 and 48 and direct the air into the space 54 between the end ring 32 and the rotor proper. In this space the air passes through the passageways 37 between the portions 35 and the plate 21 and the passageways 56 between the end ring 32 and the annulus 42 and through the spaces 38 between the fingers 33.

In operation the heavy current which flows when the rotor is being started causes excessive heating of the bars 27. Where ordinary end rings are employed these various bars would heat up and expand individually relative to the end rings. Such resulting differential axial expansion would cause these bars to break between the pole pieces and the end rings. By means of the end-ring fingers utilized, bending of the fingers occurs and the stresses ordinarily produced are taken up thereby. At the same time the blower formed by the blades 53 cool the end ring 32 and associated structure and further reduces the stresses on the parts. Heavy currents also cause expansion of the fingers 33 between the bars 27 and the end ring 32. The double bend and offset of the fingers 33 provide a flexible connection between the bars 27 and the end ring 33, thus preventing excessive radial forces from acting on the bars 27. As the end ring 32 also expands under heavy currents, and because the end ring 33 is fixed to the annulus 42 in such a manner to prevent radial, thermal and centrifugal expansion, the tangential expansion forces created are relieved by the flexibility in the offsets 39. The above construction, by utilizing flexible fingers 33 and offsets 39, effectively reduces the effect of axial, radial and circumferential forces.

The invention is highly advantageous in that undue stresses normally occurring in large synchronous motors with amortisseur windings is greatly reduced. By means of the construction shown the end rings and associated parts can readily be made in sections and assembled and secured together after the pole pieces and the running windings have been mounted on the core. With the construction of the invention illustrated, the parts are cooled and prevented from reaching an excessive temperatuture.

Changes in the specific form of the invention, as herein described, may be made within the scope of what is claimed without departing from the spirit of the invention.

Having described the invention, what is claimed as new and desired to be protected by Letters Patent is:

1. In a rotor for alternating-current machines having a core and an amortisseur winding comprising a plurality of bars extending through slots in said core, end rings at the ends of the core of the rotor and connected to said bars, longitudinally extending circumferentially spaced offsets on one of said rings extending outwardly of said core, an annulus concentric with the rotor and axially disposed outwardly of and spaced from one of said rings, bolts connecting said annulus to said offsets and blower blades attached to said annulus and directing air entering the center of the annulus outwardly toward said end ring.

2. In a rotor for alternating-current machines having a core and an amortisseur winding comprising a plurality of bars extending through slots in said core, end rings at the ends of the core of the rotor, and individual fingers issuing from the end rings, said fingers having longitudinally extending portions adjacent said ring and radial portions offset from said ring and connected to said bars outwardly from said core and forming spaces therebetween, an annulus concentric with the rotor and axially disposed outwardly of and spaced from one of said end rings, spacers between said annulus and end ring and spaced circumferentially, means for holding said annulus attached to said spacers, blower blades attached to said annulus and directing air outwardly past said core, end ring and annulus and through the spaces between said fingers.

3. In a rotor for alternating-current machines having a core and an amortisseur winding comprising a plurality of bars extending through slots in said core, end rings at the ends of the core of the rotor and connected to said bars, an annulus concentric with the rotor and axially disposed outwardly of and spaced from one of said end rings, spacers between said annulus and end ring and spaced circumferentially, means for holding said annulus attached to said spacers, blocks attached to said rotor and circumferentially spaced with reference thereto, a second annulus concentric with said rotor and attached to said blocks to form radial passageways therebetween and blower blades disposed between and attached to said annuli.

4. In a rotor for alternating-current machines having a core and an amortisseur winding comprising a plurality of bars extending through slots in said core, end rings at the ends of the core and disposed inwardly of and radially and longitudinally spaced away from said bars, and individual bendable fingers issuing from said end rings and connected to said bars, said fingers having offsets therein disposed outwardly of said end rings and between said end rings and bars, said fingers at said offsets yielding independently in both radial and axial directions to accommodate expansion and contraction of the bars and radial movement thereof.

5. In a rotor for alternating-current machines having a core and an amortisseur winding comprising a plurality of bars extending through slots in said core, end rings at the ends of the core of said rotor and spaced axially therefrom, said end ring having fingers issuing radially outwardly therefrom and connected to said bars, an annulus concentric with the rotor and axially disposed outwardly of and spaced from one of said end rings, means for connecting said annulus to said end ring at circumferentially spaced intervals and blower blades attached to said annulus and extending axially inwardly of said annulus and end ring, the outer edges of said blades terminating radially inwardly of said end ring and fingers.

6. In a rotor for alternating-current machines having a core and an amortisseur winding comprising a plurality of bars extending through slots in said core, end rings at the ends of the core and disposed inwardly of and radially and longitudinally spaced away from said bars, and individual bendable fingers issuing from said end rings and connected to said bars, said fingers having radial portions issuing from said rings and extending outwardly beyond the same, longitudinal portions extending substantially at right angles to said radial portions and inwardly toward the core, other radial portions extending outwardly from the inner ends of said horizontal portions and attached to said bars, said last-named radial portions extending radially inwardly of their localities of attachment to said bars, said fingers yielding throughout the extent of the portions thereof between said end rings and bars independently in both radial and longitudinal directions to accommodate independent radial and longitudinal movement of the bars.

References Cited in the file of this patent

UNITED STATES PATENTS

| | | |
|---|---|---|
| 516,795 | Bell | Mar. 20, 1894 |
| 680,792 | Lamme | Aug. 20, 1901 |
| 784,807 | Reist | Mar. 14, 1905 |
| 920,798 | Wiard | May 4, 1909 |
| 976,670 | Maxwell | Nov. 22, 1910 |
| 1,174,563 | Glass et al. | Mar. 7, 1916 |